US006351611B1

(12) United States Patent
Nonaka

(10) Patent No.: US 6,351,611 B1
(45) Date of Patent: Feb. 26, 2002

(54) BATTERY CHECK SYSTEM FOR USE IN CAMERAS

(75) Inventor: Osamu Nonaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/543,721

(22) Filed: Apr. 5, 2000

(30) Foreign Application Priority Data

Apr. 8, 1999 (JP) .......................................... 11-101138

(51) Int. Cl.[7] .............................. G03B 7/26; G03B 15/05
(52) U.S. Cl. ...................... 396/203; 396/206; 396/279
(58) Field of Search ................................ 396/277, 279, 396/203, 205, 206; 340/636

(56) References Cited

U.S. PATENT DOCUMENTS

| 4,866,471 | A | * | 9/1989 | Ikuta ........................ 396/279 |
|---|---|---|---|---|
| 5,424,800 | A | * | 6/1995 | Suzuki ....................... 396/279 |
| 5,640,626 | A | * | 6/1997 | Makiyama et al. ..... 340/636 X |
| 5,701,527 | A | | 12/1997 | Sakabe et al. ............... 396/277 |
| 5,732,295 | A | * | 3/1998 | Seki et al. ................... 396/279 |
| 6,134,391 | A | * | 10/2000 | Takahashi ................... 396/277 |

FOREIGN PATENT DOCUMENTS

JP           6-265967           9/1994

* cited by examiner

Primary Examiner—W. B. Perkey
(74) Attorney, Agent, or Firm—Frishauf, Holtz, Goodman, Langer & Chick, P.C.

(57) ABSTRACT

A battery check system for use in a camera has a monitor circuit and a control circuit. The monitor circuit detects the condition of a battery used in the camera. The control circuit controls the operation of the monitor circuit and controls the operation of the camera according to the output of the monitor circuit. The control circuit causes the monitor circuit to detect the changed condition of the battery and determines a detection timing of the voltage of the battery according to the detected condition of the battery.

38 Claims, 10 Drawing Sheets

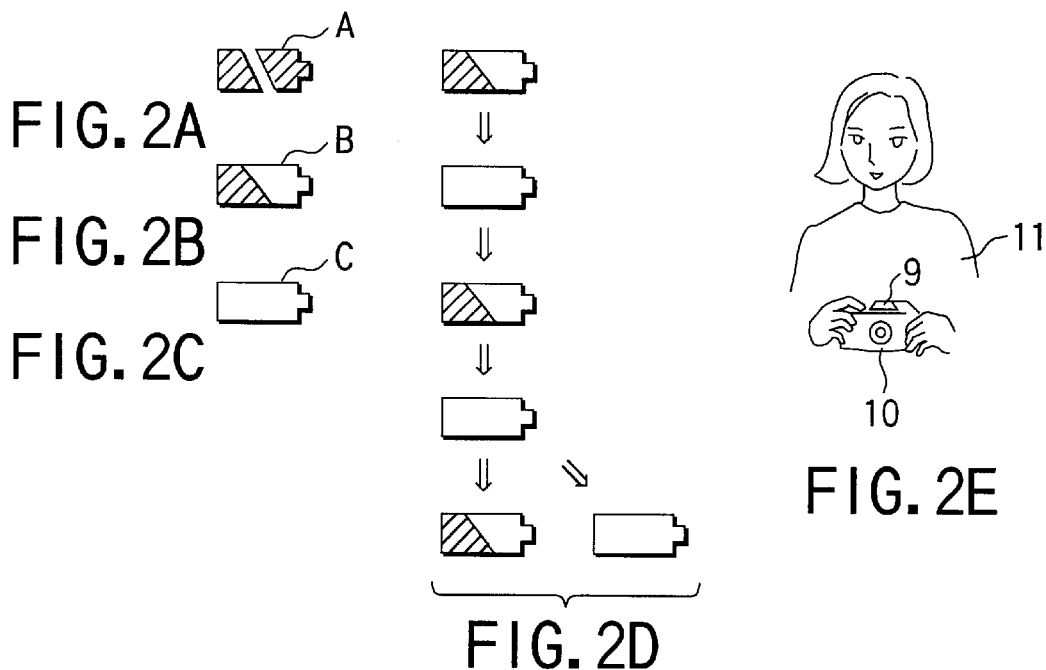
FIG. 2A
FIG. 2B
FIG. 2C
FIG. 2D
FIG. 2E
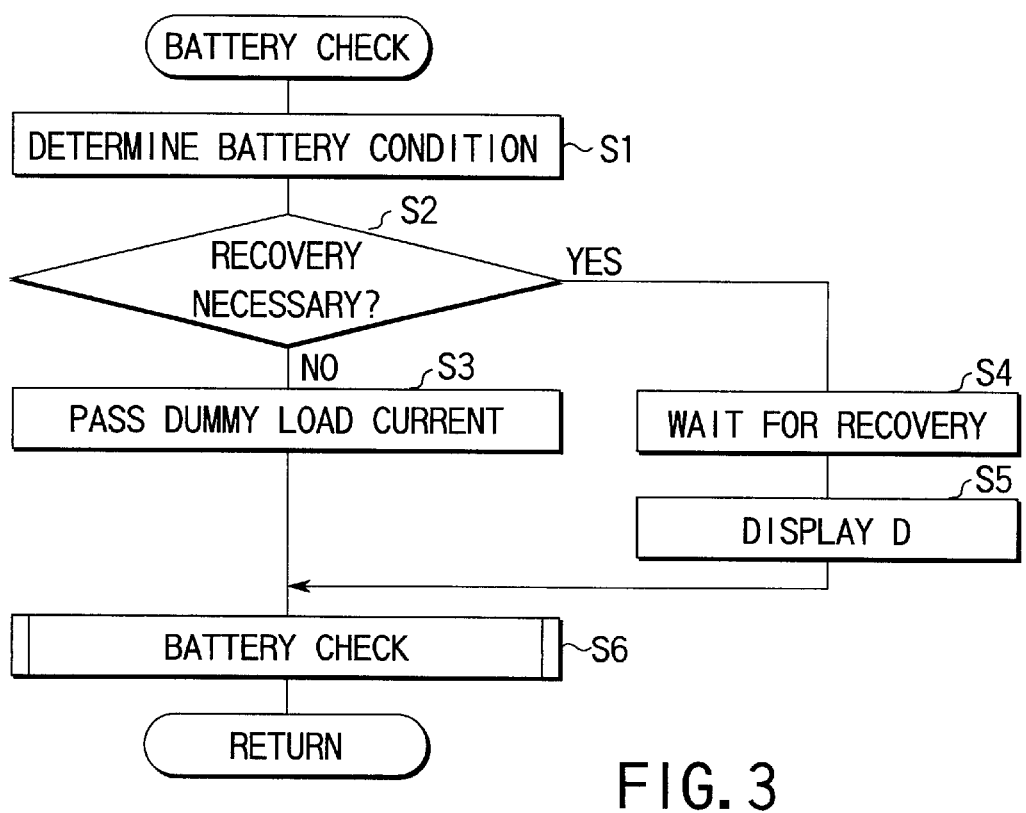
FIG. 3

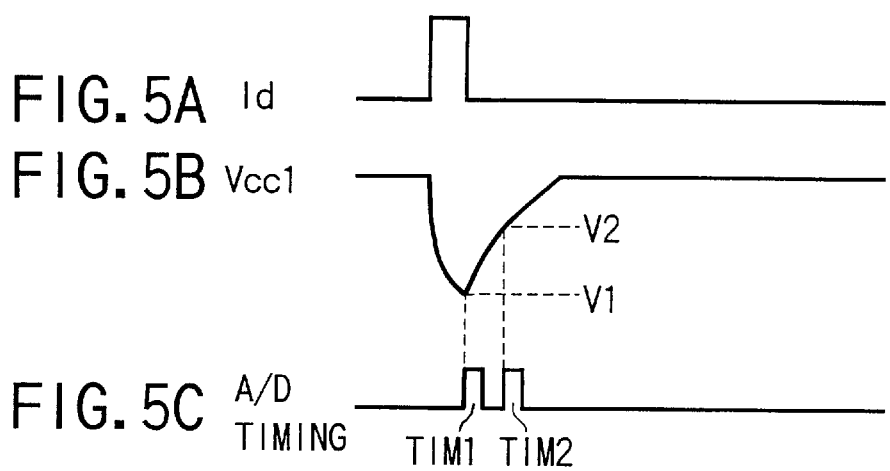
FIG. 5A Id
FIG. 5B Vcc1
FIG. 5C A/D TIMING
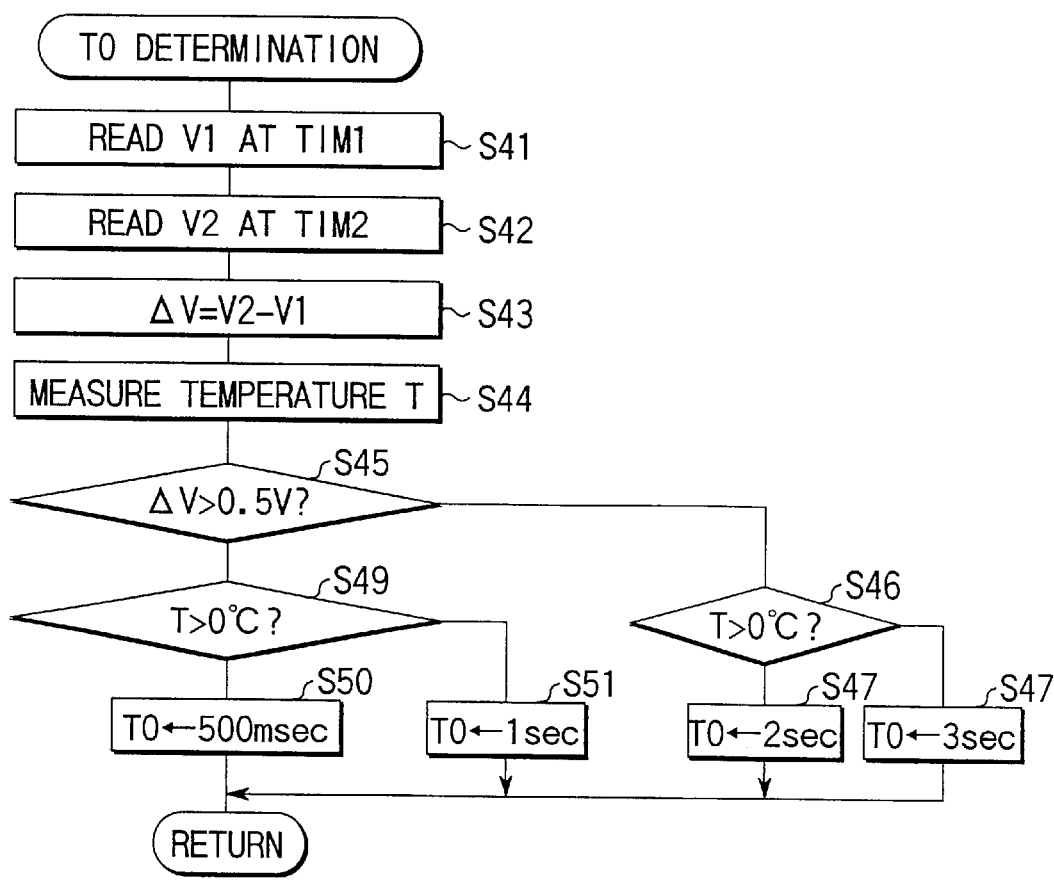
FIG. 6

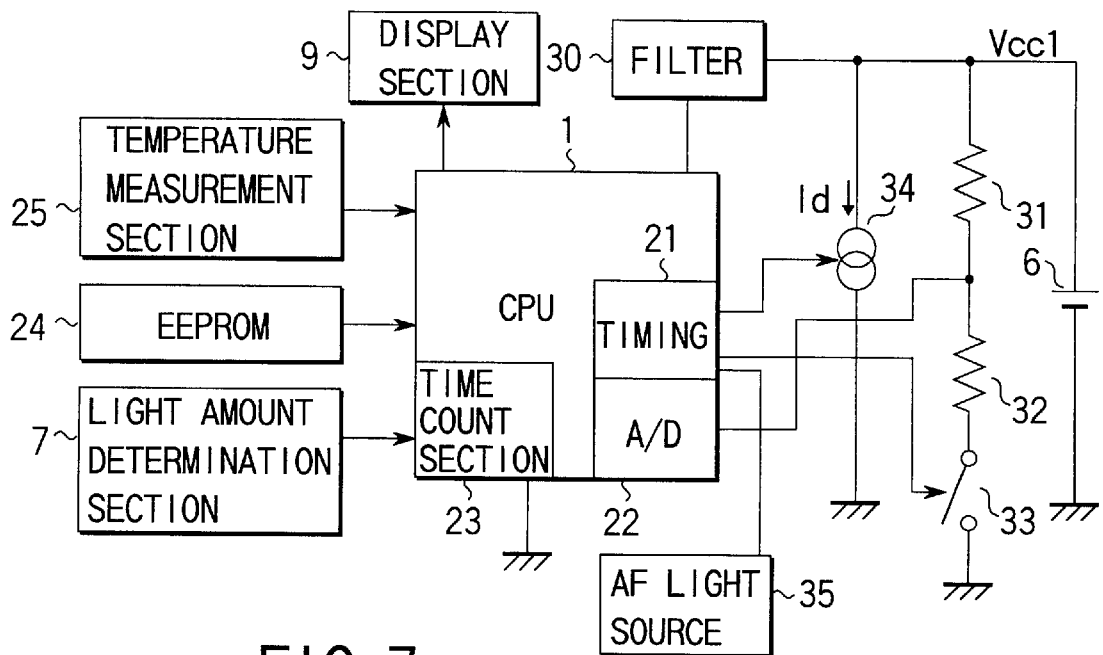
FIG. 7
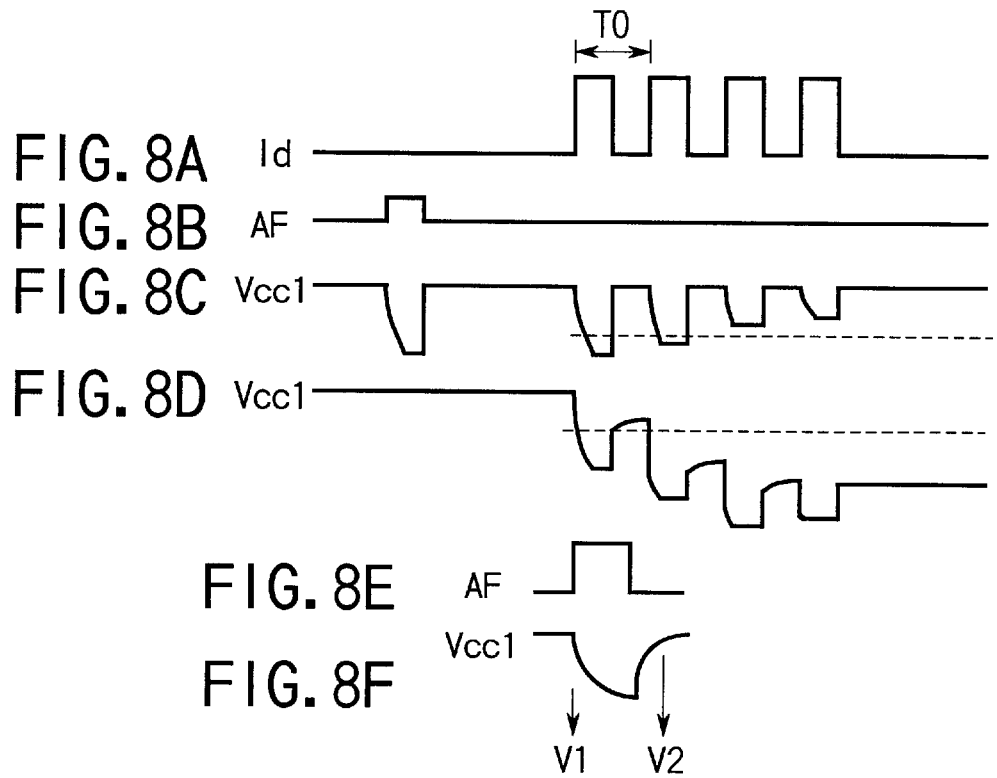
FIG. 8A  Id
FIG. 8B  AF
FIG. 8C  Vcc1
FIG. 8D  Vcc1
FIG. 8E  AF
FIG. 8F  Vcc1

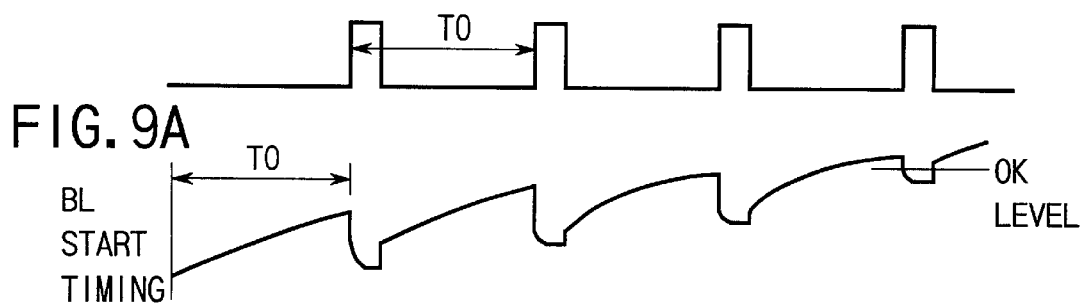
FIG. 9A
FIG. 9B
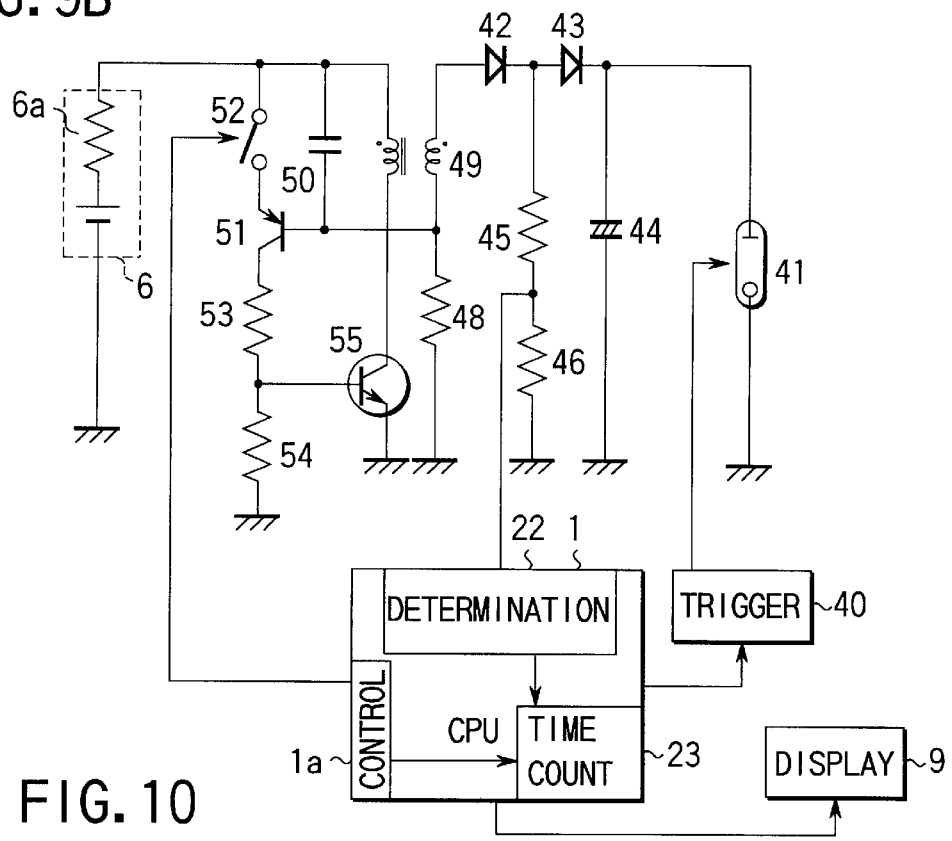
FIG. 10
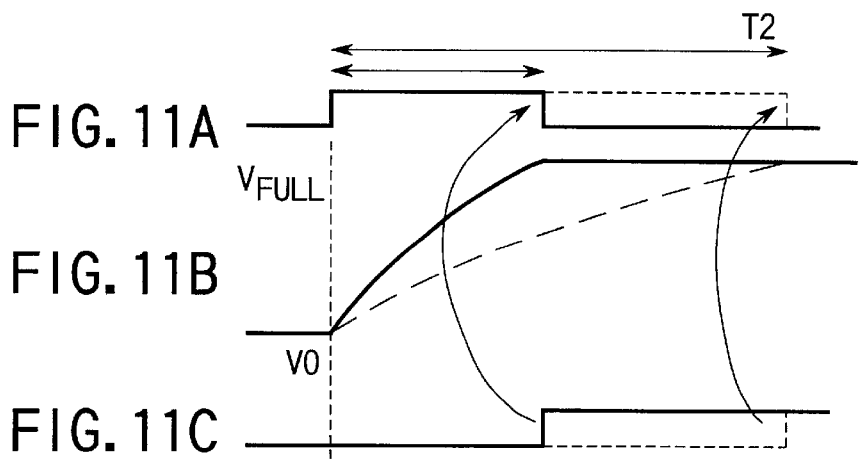
FIG. 11A
FIG. 11B
FIG. 11C

BATTERY CHECK SYSTEM FOR USE IN CAMERAS

CROSS-REFERENCE TO RELATED APPLICATIONS

This application is based upon and claims the benefit of priority from the prior Japanese Patent Application No. 11-101138, filed Apr. 8, 1999, the entire contents of which are incorporated herein by reference.

BACKGROUND OF THE INVENTION

The present invention relates to a battery check system for use in cameras. More specifically, the present invention relates to a battery check system for use in a camera which has a battery check feature for sensing the residual energy of a battery or batteries for operating the camera to detect whether the camera works properly or not and making a warning display through visual or audible means to prompt the user to replace the batteries.

The recent development of portable equipment is amazing under the circumstances that each piece of equipment that was used heretofore at the rate of one a family has come into personal use, and various battery techniques have been demanded accordingly.

Under such a background, although conventional primary personal computers and telephones were of stationary types, they have become battery-powered and even come into outdoor use for a long time.

In view of such trend of technology, importance has been increasingly attached to battery checking techniques that check batteries for residual energy. Various devices have been devised heretofore to conform to the characteristics of batteries.

In the field of cameras, a technique of detecting the battery voltage after the flash unit has been charged up is disclosed in Jpn. Pat. Appln. KOKAI Publication No. 6-265967.

This technique is characterized by controlling the second-time battery check operation in accordance with the supply voltage detected by the first-time battery check operation.

In U.S. Pat. 5,701,527 is disclosed a technique that provides against the so-called sleeping phenomenon which occurs when batteries are not used for a long time.

This technique aims at accurately checking batteries which exhibit high impedance at the initial discharge time as in the case of the sleeping phenomenon.

In the aforementioned prior art techniques, however, control is performed without taking into consideration the fact that batteries can be damaged, depending on battery conditions.

Particularly in the provision against the sleeping phenomenon, in relatively old batteries, unlike new ones, passing load current many times in the recovery wait state after discharge under heavy load will rather speed up the energy consumption of the batteries.

With the technique disclosed in the aforementioned Japanese Unexamined Patent Publication No. 6-265867, since the battery check after the flash unit has been charged up is performed on the basis of the result of the battery check prior to charging of the flash unit, the deterioration of the battery due to charging is not taken into consideration at all. In addition, no provision is made to prevent the sleeping phenomenon.

BRIEF SUMMARY OF THE INVENTION

It is therefore an object of the present invention to provide a battery check system for use in a camera which achieves energy saving to allow users to take many shots with one-time battery replacement by performing control taking into consideration the sleeping phenomenon and the recovery characteristics of a battery used.

According an aspect of the present invention there is provided a battery check system for use in a camera comprising: a monitor circuit for detecting a condition of a battery used in the camera; and a control circuit for controlling the operation of the monitor circuit and controlling the operation of the camera according to an output from the monitor circuit, and wherein the control circuit causes the monitor circuit to detect changed conditions of the battery and determines a detection timing of the voltage of the battery based on a detection result of the monitor circuit.

According to another aspect of the present invention, there is provided a battery check method for detecting the voltage of a battery aboard equipment comprising the steps of: detecting a changed condition of the battery; and determining a detection timing of the voltage of the battery based on a detection result of the changed condition of the battery.

According to still another object of the present invention, there is provided a battery check system for use in a camera comprising: monitor means for detecting a condition of a battery used in the camera; and control means for controlling the operation of the monitor means and controlling the operation of the camera according to the output of the monitor means, and wherein the control means causes the monitor means to detect changed conditions of the battery and determines a detection timing of the voltage of the battery based on a detection result of the monitor means.

According to a further aspect of the present invention, there is provided a battery check system for use in a camera comprising: monitor means for detecting a condition of a battery used in the camera; and control means for switching the monitor means between a first mode in which a changed condition of the battery is detected and a second mode in which at least one of an operation of detecting and displaying the voltage of the battery at a predetermined time and an operation of enabling the camera to take a shot is performed, and wherein the control means switches the time at which the voltage of the battery is detected in the second mode according to the result of detection of the condition of the battery in the first mode.

According to another aspect of the present invention, there is provided a battery check system for use in a camera comprising: monitor means for detecting a condition of a battery used in the camera; charging means for charging an electronic flash unit for emitting an electronic flash of light; first detecting means for detecting at least one of a time after the termination of charging the electronic flash unit and a charging time; second detecting means for detecting the voltage of the battery and switching the operation of the camera on the basis of the detected battery voltage; and control means for switching the time at which the battery voltage is detected by the second detecting means according to a detection result detected by the first detecting means.

According to still another aspect of the present invention, there is provided a camera having a plurality of modes for determining a condition of a battery for operating the camera comprising: mode switching means for switching the modes; and control means responsive to the mode switching means for switching forms of display visible to users.

Additional objects and advantages of the invention will be set forth in the description which follows, and in part will be obvious from the description, or may be learned by practice of the invention. The objects and advantages of the invention

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

FIGS. 2A to 2D shows forms of display;

FIG. 2E shows the manner in which a warning display is made to prompt the user to replace a battery;

FIG. 3 is a flowchart illustrating the procedure of determining the battery condition in two stages in the first embodiment;

FIGS. 5A to 5C are timing diagrams illustrating the manner in which the CPU of FIG. 1 reads changes in the battery voltage at different times;

FIG. 6 is a flowchart illustrating the procedure of the recovery time determination subroutine in FIG. 4A;

FIG. 7 shows an arrangement of a camera battery check system according to a second embodiment of the present invention;

FIGS. 8A to 8F are timing diagrams for use in explanation of the operation of the battery check system of the second embodiment;

FIGS. 9A and 9B are timing diagrams for use in explanation of the operation of the battery check system of the second embodiment;

FIG. 10 shows a circuit arrangement of a flash unit for use in a camera according to a third embodiment of the present invention;

FIGS. 11A to 11C illustrate the manner in which the charging time varies according to battery condition;

DETAILED DESCRIPTION OF THE INVENTION

Figure 1A:
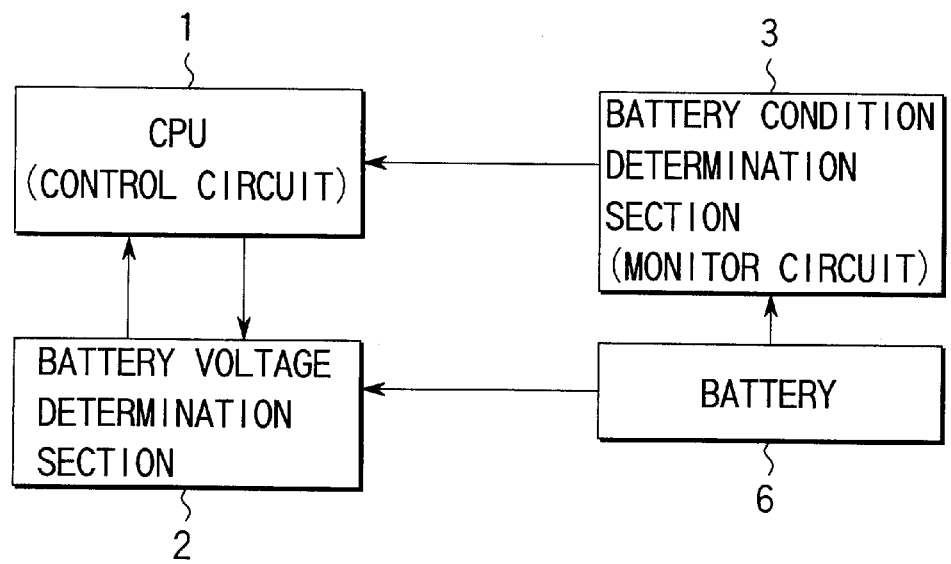
FIG. 1A is a conceptual diagram of a battery check system for use in a camera according to a first embodiment of the present invention.

Reference will now be made in detail to the presently preferred embodiments of the invention as illustrated in the accompanying drawings in which like reference numerals designate like or corresponding parts.

FIG. 1A is a simplified block diagram of a camera battery check system according to a first embodiment of the present invention.

This camera battery check system is constructed, as show n in FIG. 1A, from a central processing unit (CPU) 1 serving as a control circuit for implementing overall control, a battery voltage determination section 2, a battery condition determination section 3, and a battery 6.

The control circuit (CPU) 1 comprises a one-chip microcomputer and has internal memories (RAM and ROM) not shown. The control circuit reads a sequence program out of the ROM and carries out sequence control for the camera in accordance with the sequence program and various processing, such as operations on data from various sections and determination, in corporation with the RAM.

The battery voltage determination section 2 is adapted to determine how much the energy of the battery 6 used in the camera has been consumed (the energy consumption of the battery).

The conventional camera battery check systems detect the energy consumption of the battery 6 only by the battery voltage determination section 2.

The battery 6 produces an output voltage by chemical reactions. Thus, not only changes its terminal voltage with the use of the battery, but its internal impedance (internal resistance) also changes according to the amount of current dissipated at the time of use and the elapsed time after it was used.

The internal impedance also changes greatly according to the temperature of the environment in which the battery is used and the period of time during which and the conditions under which the battery is kept since it was manufactured.

For this reason, the battery voltage determination section 2 may detect the battery voltage repeatedly to improve accuracy.

The battery voltage determination method of this embodiment will be described in detail by comparison with the conventional battery voltage determination method.

In general, the determination of the voltage of a battery with no load being applied to the battery, i.e., under the condition that no current is being passed through it results in the measurement under the condition that the internal resistance of the battery is ignored, i.e., under the condition that differs from the actual used condition.

Thus, the conventional techniques determine the voltage of a battery with substantially the same amount of current as in the actual used condition being passed through the battery.

This load current, which is referred to as dummy load current, can destroy an insulating thin film which is formed within the battery when it is not put into use to prevent the occurrence of the so-called sleeping phenomenon.

On the other hand, passing dummy load current many times through the battery which is in the process of recovery after use may result in early deterioration of the battery.

In view of the above-mentioned things, the camera battery check system according to the first embodiment of the present invention is arranged to determine the changed conditions of the battery 6 by the battery condition determination section 3 serving as a monitor circuit and then switch the control of the battery voltage determination section 2 accordingly.

Figure 1B:
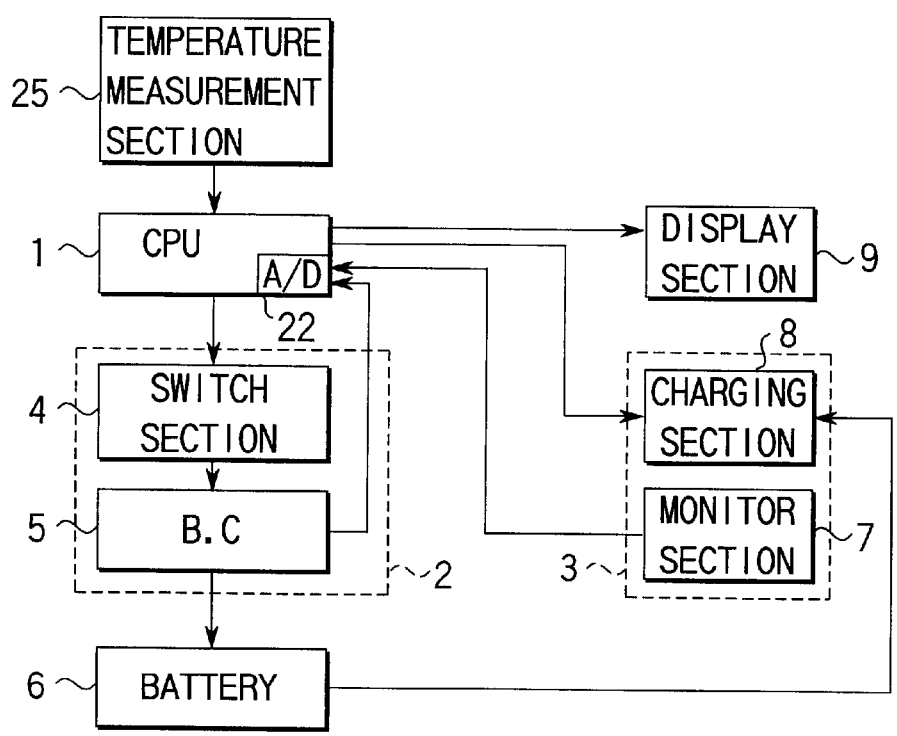
FIG. 1B is a more detailed block diagram of the battery check system of FIG. 1A.

FIG. 1B shows a more detailed arrangement of the system shown in FIG. 1A.

As shown in FIG. 1B, the battery voltage determination section 2 is composed of a switch section 4 and a battery check (BC) section 5.

The battery condition determination section 3 is composed of a charge section 8, a monitor section 7, the switch section 4, and the battery section 5.

The battery voltage determination section 2 and the battery condition determination section 3 differ from each other only in determination procedure and timing and part of the hardware configuration is therefore used in common for them as described above.

In a second embodiment to be described later that utilizes the point that the charging characteristics of flash unit can be converted to the characteristics of a battery, the charge section 8 and the monitor section 7 that monitors the charged voltage correspond to the battery condition determination section 3.

To the CPU 1 is connected a temperature measurement section 25.

In the actual mode of use, as shown in FIG. 2E, the CPU 1 operates a display section 9 of a camera 10 and, when necessary, makes a warning display to prompt a user 11 to replace the battery 6 in accordance with the result of a determination of the degree of energy consumption (deterioration) of the battery.

That is, when there is no energy consumption of the battery 6, i.e., when the battery is full of energy, the CPU 1 displays a display A shown in FIG. 2A.

When the battery energy has been consumed to some degree, a display B shown in FIG. 2B is displayed.

That is, the CPU 1 switches LCD segments to allow the user 11 to recognize graphically the varying degrees of energy consumption of the battery 6.

When the battery is of such energy that it can no longer be used, a display C shown in FIG. 2C is displayed.

Reference is made to a flowchart of FIG. 3 to describe a procedure of the camera battery check system of the first embodiment for determining the battery condition in two stages.

Upon entry into this procedure, the battery condition determination section 3 makes a determination of the battery condition (step S1) and the CPU 1 then makes a determination of whether a time is required for the battery 6 to recover (step S2). When it is required to wait until the battery recovers, the CPU 1 enters the wait state and displays to the user that the battery is waiting to recover (steps S4 and S5). The CPU carries out a battery checking subroutine (step S6) and then exits from the procedure.

On the other hand, if, in step S2, no recovery is necessary, then the CPU 1 sends a dummy load current for preventing the sleeping phenomenon to the battery 6 (step S3), then carries out the battery checking subroutine (step S6) and exits from the procedure.

In step S5, a display D is made as shown in FIG. 2D.

That is, the display D is made so that the picture B shown in FIG. 2B and the display C shown in FIG. 2C alternate, thereby indicating that the battery is waiting for recovery.

Such a display allows the user to know that the battery is waiting for recovery with no need of adding any special means to the LCD.

If the battery 6 has recovered in step S4, then the CPU 1 causes the battery voltage determination section to fix the display B. If, the battery 6 has not recovered and the battery 6 has not use to continue in step S4, then CPU 1 cause the battery voltage determination section to fix the display C and to inhibit the camera operation.

After the display C is displayed, the further operation of the camera with the same battery is impossible. Trying to operate the camera with an insufficient voltage may result in abnormal operation of the camera due to static electricity or noise.

Figure 4A:
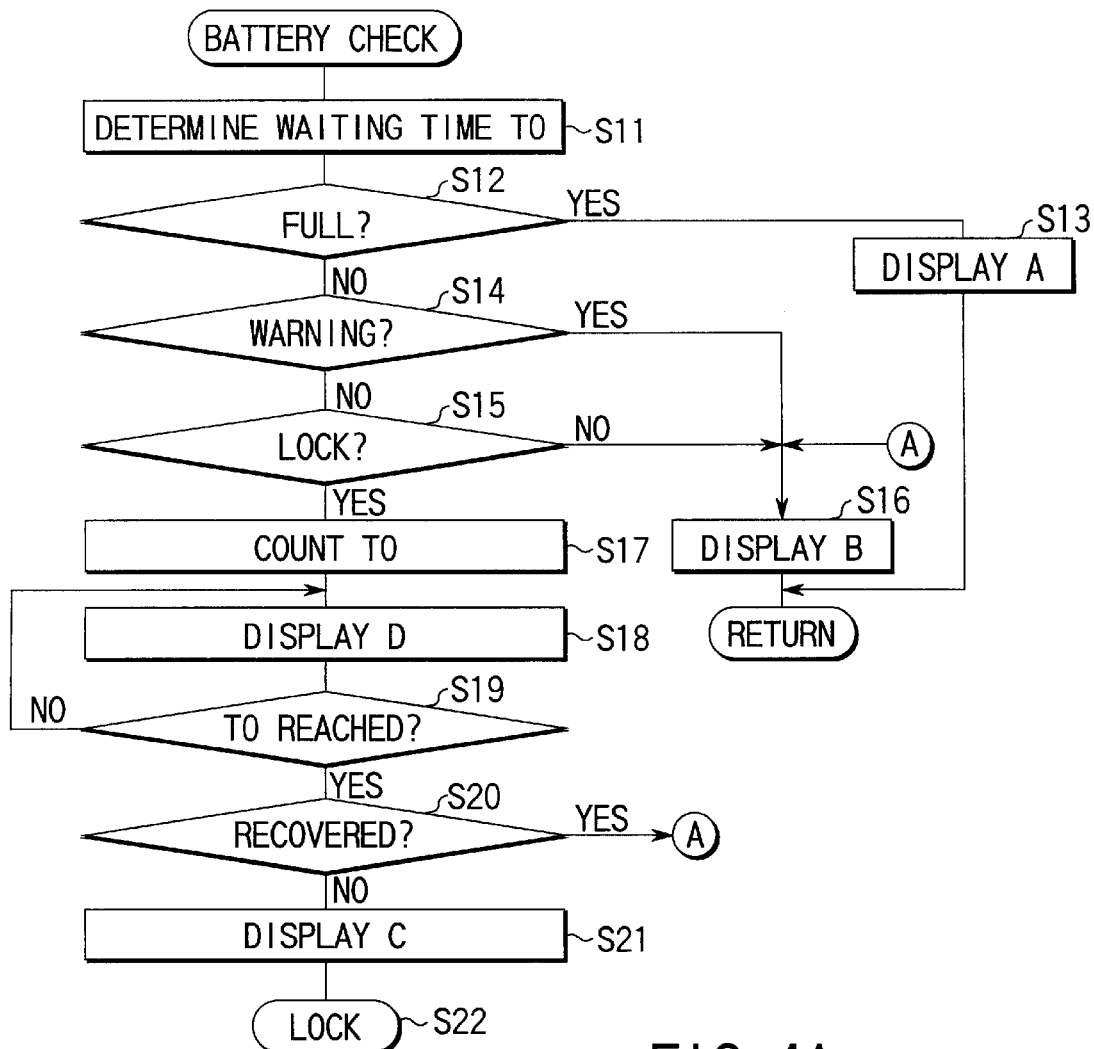
FIG. 4A is a flowchart illustrating the procedure of the battery check subroutine in FIG. 3.
Figure 4B:
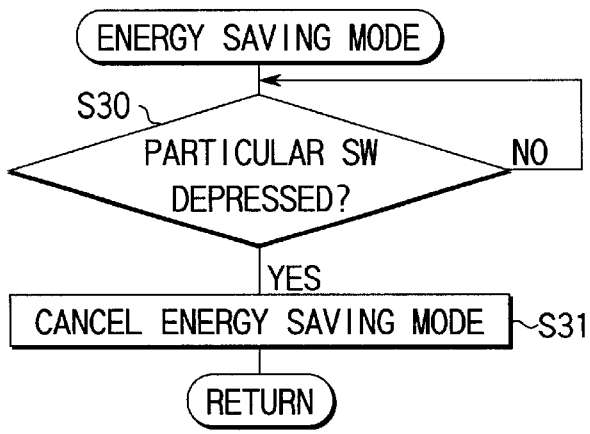
FIG. 4B is a flowchart illustrating the procedure in energy saving mode.

If, therefore, the state of a particular switch (SW), for example, the camera main switch, is not changed, the CPU 1 places the camera into the energy saving mode in which the camera becomes inoperative as shown in FIG. 4B (steps S30 and S31).

In the energy saving mode, the clock of the CPU 1 is stopped with the result that all the ports are fixed to one direction and the current dissipation falls below 1 $\mu$A.

By setting the energy saving mode, malfunctions of the camera can be prevented surely. However, that the camera remains inoperative unless the particular switch is operated is a great disadvantage to users who want to take pictures in succession even if the battery 6 has recovered.

To solve such a problem, the present embodiment is further arranged to allow users to take pictures in succession with no need of the above-mentioned switch operation by disabling the camera from entering the energy saving mode and continuing to make the recovery waiting display if there is the possibility that the battery 6 may recover.

The battery checking subroutine in step S6 of FIG. 3 will be described with reference to a flowchart of FIG. 4A.

Upon entry into this procedure, the CPU 1 first carries out a waiting time To determining subroutine to predict the battery recovery time To on the basis of the result of the determination of the battery condition in step S1 (step S11).

Subsequently, the CPU 1 causes the monitor section 7 to detect the voltage of the battery 6 (steps S12, S14 and S15). If the determination is that the battery 6 has sufficient residual energy, then the CPU displays the display A shown in FIG. 2A (step S13) and then exits from the procedure.

If the determination is that the battery 6 has sufficient residual energy but a warning is to be issued to the user, or if the determination is that the battery has such residual energy that lock is not required, then the CPU 1 displays the display B shown in FIG. 2B (step S16) and then exits from the procedure.

If, on the other hand, the determination in step S15 is that lock is required, then the CPU 1 starts counting the battery recovery time To (step S17) and makes the display D shown in FIG. 2D until the recovery time To is reached. When the battery recovery time To is reached, the CPU 1 causes the monitor section 7 to detect the voltage of the battery 6 (step S20). As a result, if the determination is that the voltage of the battery 6 has recovered, the CPU 1 goes to step S16 to make the display B and then exits from the procedure.

That is, when the determination in step S20 is that the voltage of the battery 6 has recovered, the display B shown in FIG. 2B is displayed, which allows the user to take the next shot without any special operation.

On the other hand, when the battery 6 has not recovered, the CPU I makes the display C (step S21) and enters the lock mode (the energy saving mode) (step S22).

Next, the recovery waiting time To determining subroutine in step S11 will be described in detail with reference to FIGS. 5A to 5C and FIG. 6.

In timing diagrams shown in FIGS. 5A to 5C, Id of FIG. 5A indicates the timing of a dummy load current from the battery 6.

The voltage Vcc1 of the battery 6 is lowered momentarily due to dissipation by the internal resistance of the battery 6 and the dummy load current Id, but it will return to the original voltage through recovery action (see FIG. 5B).

The CPU 1 reads values of the changing battery voltage Vcc1 at times TIM1 and TIM2 with its built-in A/D converter 22 (see FIG. 5C).

More specifically, the CPU 1 reads the value V1 of the changing battery voltage Vcc1 at time TIM1 within the time interval when Id is on (step S41).

Likewise, the CPU 1 reads the value V2 of the changing battery voltage Vcc1 at time TIM2 after the dummy load current has been turned off (step S42). The CPU 1 then determines the difference $\Delta V$ between V2 and V1 (step S43).

The CPU 1 then causes the temperature measurement section 25 to measure the temperature (step S44) and sets the waiting time To for recovery of the battery 6 on the basis of $\Delta V$ and the measured temperature (steps S45 through S50).

In detail, when $\Delta V>0.5$ and $T>0°$ C., the recovery waiting time To is set to To=500 msec (step S50). When $\Delta V>0.5$ and $T\leq0°$ C., To=1 sec (step S51). When $\Delta V\geq0.5$ and $T>0°$ C., To=2 sec (step S47). When $\Delta V\geq0.5$ and $T\leq0°$ C., To=3 sec (step S48).

Thus, at low temperatures, since the chemical actions with in the battery 6 are slow and the battery recovery is delayed, it is necessary to take time for the battery 6 to recover. If $\Delta V$ is larger, then more time is taken for the battery to recover.

As described above, the first embodiment switches the forms of display after battery check in accordance with the battery conditions of the camera and allows the user to continue taking pictures with the battery replaced once, increasing the number of shots without waiting with impatience for the battery to recover.

When the procedure of FIG. 3 goes to step S6 after a long waiting time for battery recovery in step S4, it follows that the waiting time has resulted in waste.

Therefore, it is required to keep the recovery waiting time within a relatively short time, for example, about five seconds at most.

Next, a second embodiment of a second embodiment of the present invention will be described.

FIG. 7 is a block diagram of a camera according to the second embodiment of the present invention.

In FIG. 7, there are illustrated a current source 34 for providing the above-mentioned dummy load current Id, resistors 31 and 32 for dividing the battery voltage Vcc1, and a switch 33.

When the switch 33 is turned on under the control of the CPU 1, the battery voltage Vcc1 is divided by the resistors 31 and 34 to provide a low voltage suitable for A/D conversion by the A/D converter 22.

Turning the current source on and off at this point will allow the changed conditions of the battery 6 to be detected as described previously in connection with FIGS. 5A to 5C and FIG. 6. In this example, however, the changed conditions of the battery are detected by using an autofocus (AF) circuit which infrared radiation to measure the subject distance.

An AF light source 35 requires a large current of the order of one ampere to emit light. Thus, the characteristics of the battery 6 can be detected amplified.

For example, in the case of a battery having an internal resistance of 0.3 ohms, the flow of a current as high as one ampere through the battery will produce a difference of 0.3 volts, which is detectable. With a current of 10 milliamperes, the terminal voltage of the battery is changed only by 3 millivolts, which is difficult to detect.

Thus, monitoring the battery voltage Vcc1 before and after sending a current to the AF light source 35 allows the changed conditions of the battery 6 to be known through the difference $\Delta V=V1-V2$ (see FIGS. 8E and 8F).

In this case, the timing control is performed by a timing control circuit 21 in the CPU 1.

Even if the battery voltage Vcc1 changes greatly as described above, the supply voltage to the CPU 1 is stabilized by a filter circuit 30.

The CPU 1 further includes a time count facility 23 and an operations facility not shown.

The CPU 1 performs charging control of the flash unit through the use of a charged-state determination circuit (monitor section) 7, receives temperature information from the temperature measuring section 25, and controls lens control means and shutter control means in a sequential manner using information written into an EEPROM 24 at the time of manufacture of the camera.

Hereinafter, the operation of the camera thus arranged will be described with reference to timing diagrams shown in FIGS. 8A through 8F and FIGS. 9A and 9B.

After current supply to the AF light source 35, the current source 34 is turned on many times before shooting to monitor the battery voltage Vcc1.

Turning the current source 34 on many times is intended to allow the battery to exit from the performance-deteriorated state due to the sleeping phenomenon. This has the effect of reducing the internal resistance, so that Vcc1 is restored to the OK level (see FIGS. 8A to 8C).

However, repeating a battery check on the battery 6 by passing the dummy load current through it many times as shown in FIG. 8D may cause the battery to rapidly deteriorate and become unusable though it should be able to be still used.

In view of this, the second embodiment is arranged to make longer the battery check interval To, as shown in FIGS. 9A and 9B, when $\Delta v$ (=v1−v2), which is a change in the battery voltage resulting from passing a current through the AF light source 35, is greater than a predetermined value, thereby promoting recovery rather than consumption.

As described above, according to the second embodiment, the accuracy is improved by the repeated battery check, the prevention of the sleeping phenomenon is promoted, and the deterioration of the battery can be detected with greater accuracy.

In addition, the first battery determination is made through the use of current supply to the AF light source, which avoids wasteful consumption of energy.

Next, a third embodiment of the present invention will be described.

FIG. 10 shows the circuit arrangement of an electronic flash unit for use with a camera battery check system according to the third embodiment of the present invention.

As shown in FIG. 10, the battery 6 containing internal resistance 6a has its one end connected to ground and its other end connected through the primary winding of a transformer 49 to the collector of a transistor 55.

The connection point of the battery 6 and the transformer 49 is connected through a switch 52 to the emitter of a transistor 51.

The collector of the transistor 51 is connected to ground through a series combination of resistors 53 and 54.

The connection point of the resistors 53 and 54 is connected to the base of the transistor 55.

The emitter of the transistor 55 is connected to ground.

The secondary winding of the transformer 49 has its one end connected through a resistor 48 to ground and its other end connected through diodes 42 and 43 to an end of a xenon (Xe) tube 41.

The other end of the xenon tube 41 is connected to ground.

The connection point of the diodes 42 and 43 is connected through a series combination of resistors 45 and 46 to ground.

The connection point of the resistors 45 and 46 is connected to a determination section 22 of the CPU 1.

The connection point of the diode 43 and the Xe tube 41 is connected to an electronic flash-unit main capacitor 44.

The on-off control of the switch 52 is performed by a charge control section 1a of the CPU 1.

In the CPU 1, the charge control section 1a and the determination section 22 are connected together to a timing section 23.

The CPU 1 is connected to the Xe tube 41 through a trigger circuit 40 and to a display section 9.

In the flash unit thus arranged, when the switch 52 is turned on by the CPU 1, the transistor 55 is rendered conductive, allowing current to flow through the transformer 49 and the main capacitor 44 to be charged through the diodes 42 and 43.

When a current is made to flow through the secondary winding of the transformer 49 by the transistor 55 being rendered conductive, a voltage drop is developed across the resistor 48, which causes the transistor 51 to be turned off. The transistor 51 being turned off causes the transistor 55 to be turned off, lowering the voltage across the resistor 48 and then turning the transistor 51 on again. This operation is repeated by the action of a capacitor 50, so that the main capacitor 44 continues to be charged.

The charged voltage of the main capacitor 44 is divided by the series-connected resistors 45 and 46 and the divided voltage is monitored by the CPU 1. When the charged voltage reaches a predetermined one, the switch 52 is turned off by the CPU 1, so that the charging of the main capacitor is terminated.

At this point, when the Xe tube 41 is triggered by the trigger circuit 40, the main capacitor 44 discharges through the Xe tube to thereby cause the tube to emit a flash of light.

The charging of the main capacitor requires more current than when the AF light source 35 is triggered to emit light, providing an effective opportunity for determining the battery condition.

With a new battery, rapid charging is performed on the main capacitor as indicated by solid lines in FIGS. 11A to 11C. With a deteriorated one, on the other hand, the charging time To becomes markedly long as indicated by broken lines in FIGS. 11A to 11C.

Figure 12:
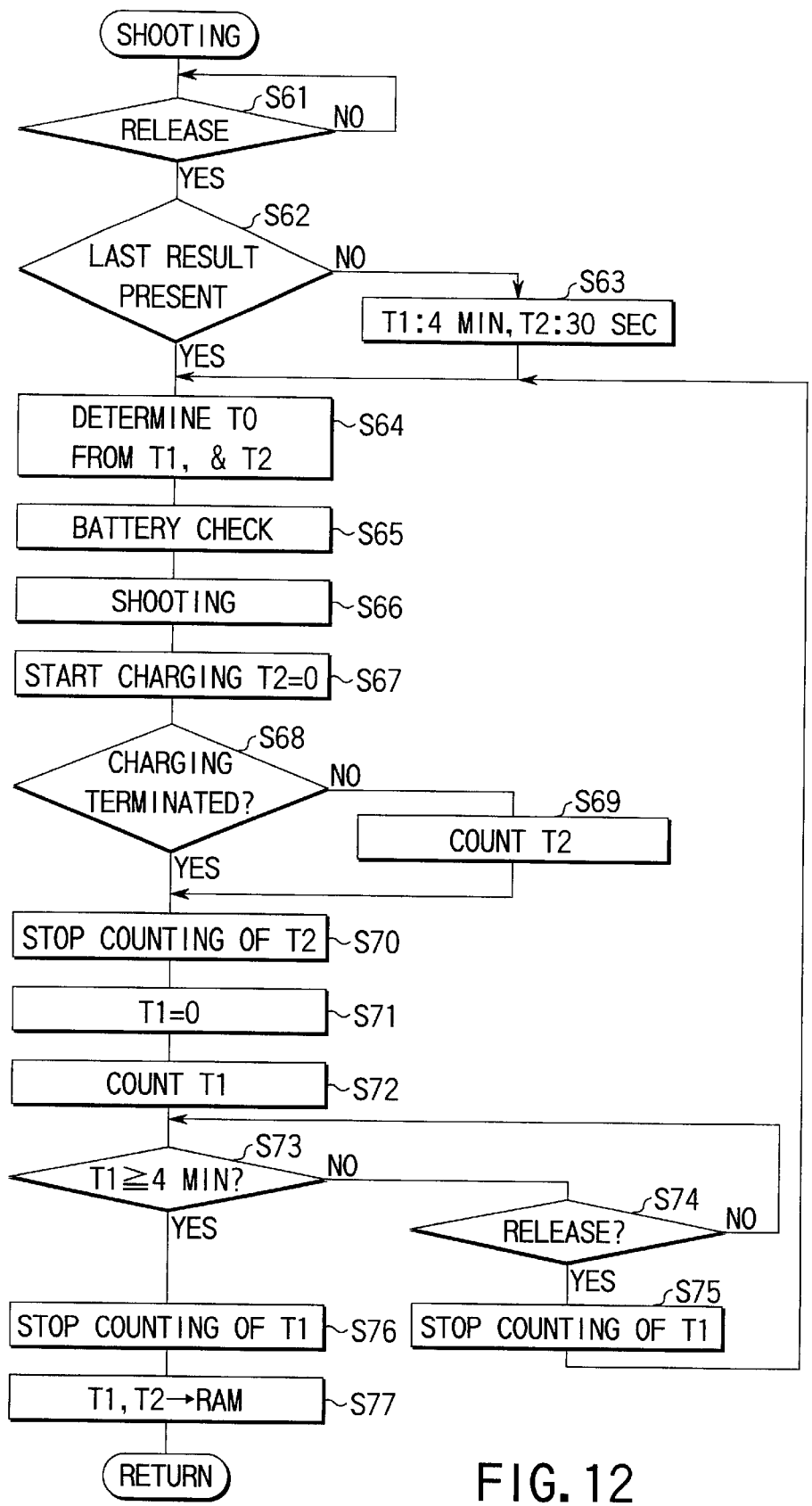
FIG. 12 is a flowchart illustrating the shooting procedure according to the third embodiment of the present invention.

Reference is next made to a flowchart of FIG. 12 to describe the shooting procedure of the camera according to the third embodiment.

When a release switch not shown is depressed (step S61), the CPU 1 makes a decision of whether the last result is present or absent (step S62).

In the absence of the last result, the CPU 1 sets T1=4 min and T2=30 sec as default values (step S63) and then goes to step S64.

In the presence of the last result, on the other hand, the CPU 1 goes directly to step S64.

Next, the battery check timing To as shown in FIGS. 9A and 9B is determined in accordance with the charging time and the elapsed time from the termination of charging. In the absence of the last result, that is, immediately after the battery is replaced, the CPU 1 sets the timing To on the basis of the default values.

In the presence of the last result, that is, when measured T1 and T2 are left recorded in RAM, the timing To is set based on T1 and T2 (step S64).

Subsequently, the battery check is made in accordance with the procedure described in connection with FIG. 4A (step S65).

Although the repeated battery check is not referred to in FIG. 4A, application and modification are easy.

When the result of the battery check is OK, the CPU 1 allows a shooting operation.

When this shooting is accompanied by emission of a flash of light, it is required to charge the flash unit for the next shot.

A charging operation is then started (step S67). A decision is made as to whether the charging has terminated in accordance with the way described previously in connection with FIGS. 11A to 11C.

The time that elapses before the charging terminates is counted as T2 (steps S68 and S69).

When T2 has been counted, the battery 6 has deteriorated and recovery is therefore needed. The time for recovery is counted as T1 (steps S71 and S72).

When T1 reaches four minutes or more, the battery 6 is considered to have recovered sufficiently. As a result, the time count is terminated (step S76) and measured T1 and T2 are then recorded in the RAM (step S77).

T1 and T2 thus obtained are used to determine the next battery check timing To.

When the release switch is depressed in step S74 before T1 reaches four minutes, the time count is terminated (step S75) and the CPU 1 then repeats the procedure beginning with step S64.

Figure 13:
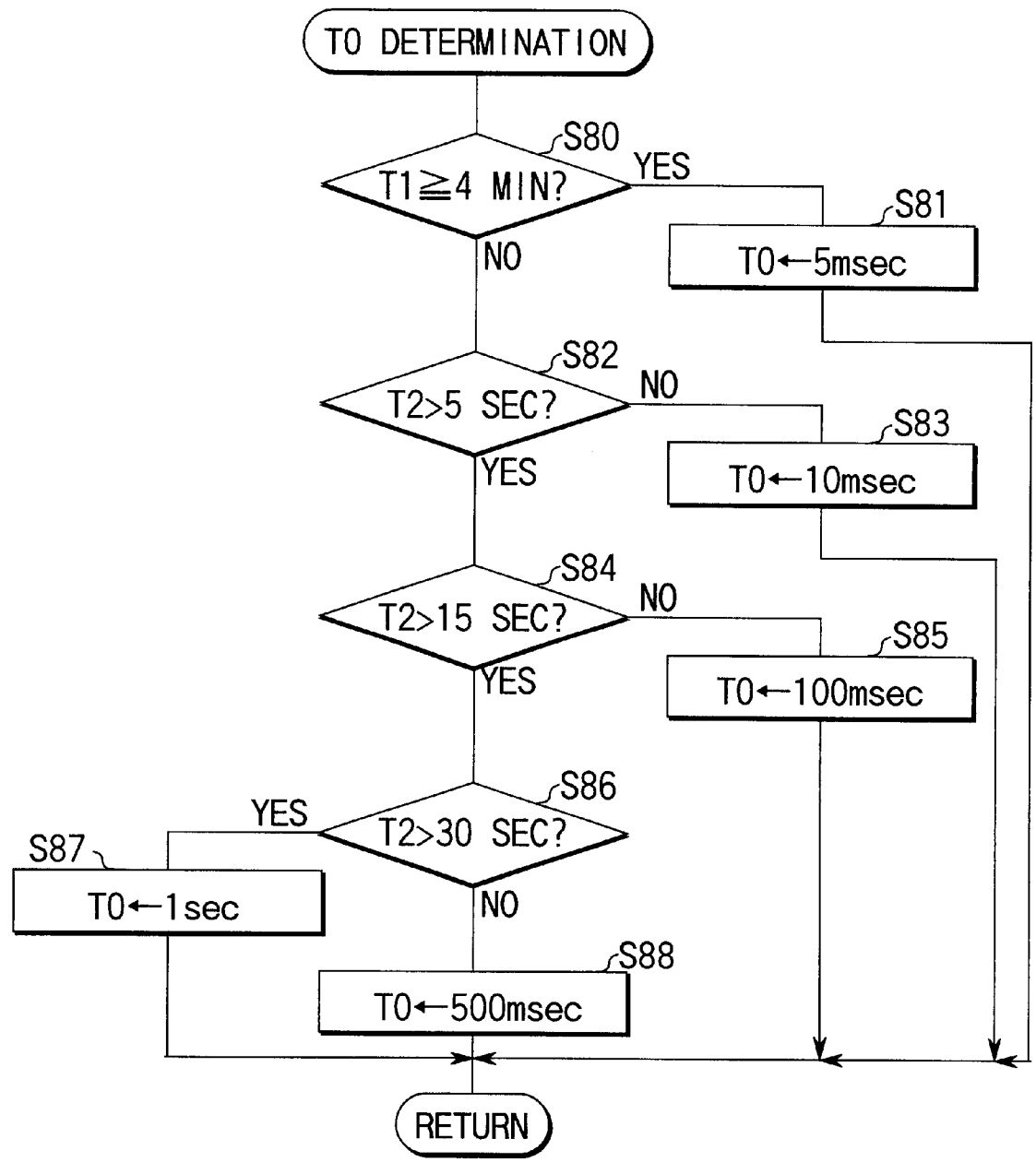
FIG. 13 is a flowchart illustrating the way to determine To in FIG. 12.

Reference is made next to a flowchart of FIG. 13 to describe the process of determining To in step S64 of FIG. 12.

After a lapse of four minutes or more, the CPU 1 sets the battery check repetition time To so small as to be 5 msec, in view of time lag (steps S80 and S81).

When T1 does not reach four minutes, the CPU 1 sets the battery check repetition time To on the basis of the charging time T2 because the battery 6 is considered not to have recovered.

That is, if T2 is considered to be equal to or less than five seconds, then the CPU 1 sets To to 10 msec (steps S82 and S83).

If T2 is considered to be more than five seconds but less than or equal to 15 seconds, then the CPU 1 sets To to 100 msec (steps S84 and S85).

If T2 is considered to be more than 15 seconds but less than or equal to 30 seconds, then the CPU 1 sets To to 500 msec (steps S86 and S88).

If T2 is considered to be more than 30 seconds, then the CPU 1 sets To to 1 sec (steps S86 and S87).

As described above, the third embodiment determines the battery check timing from the workings of the flash unit that consumes energy most in the overall operation of the camera and the recovery time of the battery 6, allowing the battery check with no deterioration of the battery.

Figure 14:
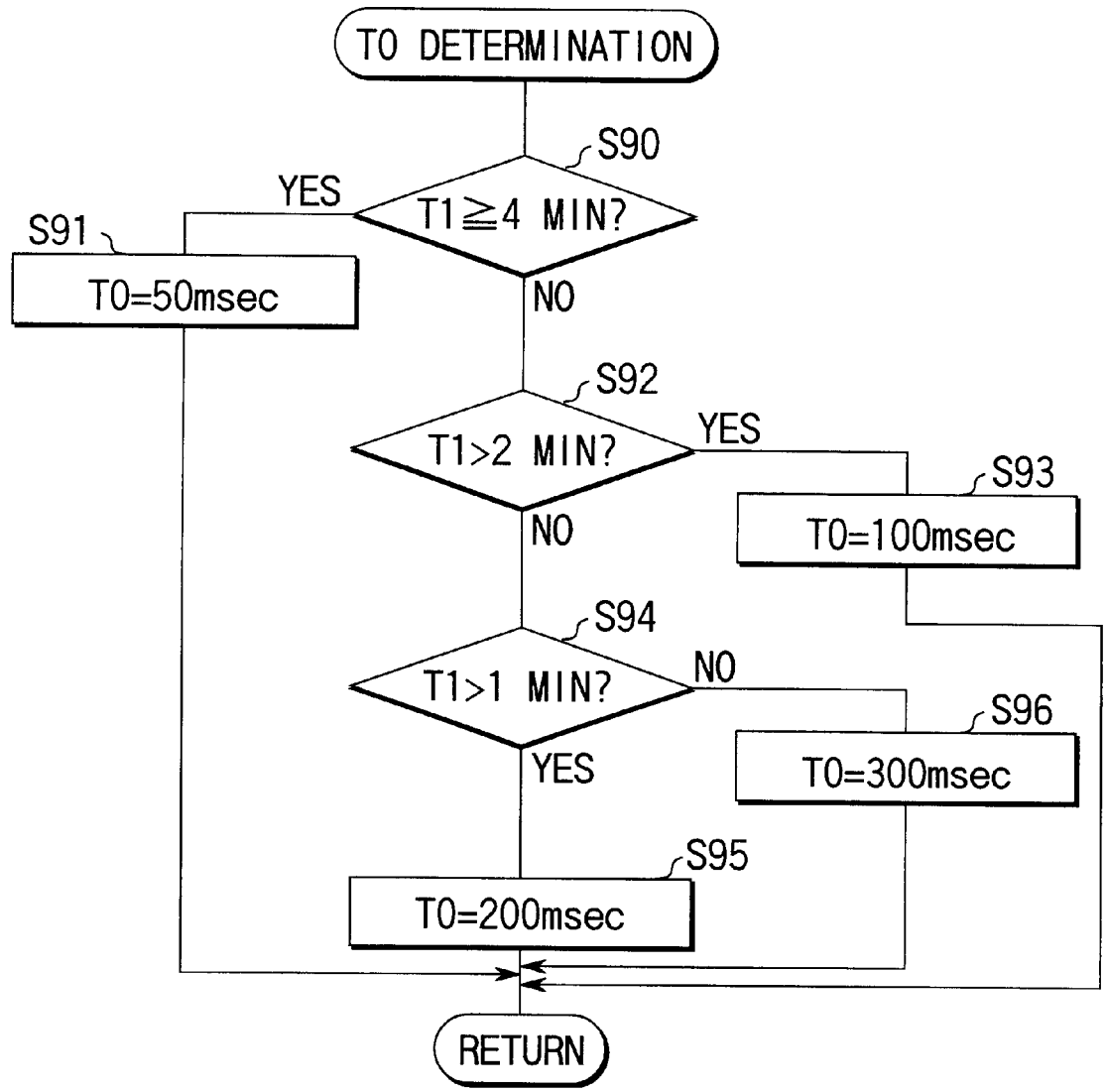
FIG. 14 is a flowchart illustrating the procedure of switching the battery check timing on the basis of recovery time only.

The battery check timing To may be switched on the basis of T1 (recovery time, i.e., the elapsed time from when the last time the charging was terminated) not on the basis of the charging time T2 (see steps S90 through S96 in FIG. 14).

When To is made long, a release time lag results. At this point, such a display as shown in FIG. 2D can be made to allow the user to confirm charging.

Instead of using LCD, LEDs may be blinked.

Some cameras are equipped with LEDs in the vicinity of the viewfinder which blink while the flash unit is being charged or in the event of an autofocus failure. These LEDs may be used.

Figure 15A:
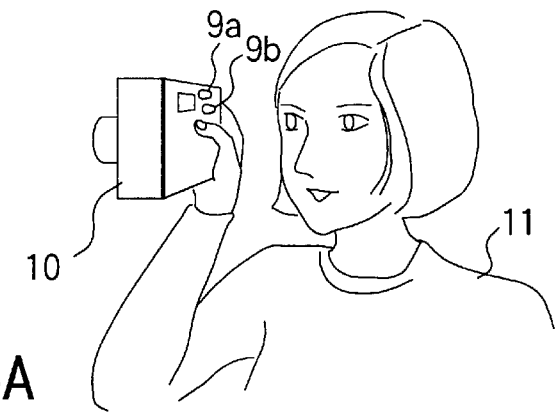
FIGS. 15A to 15C show an example of using LEDs in the vicinity of the viewfinder for warning display.
Figure 15B:
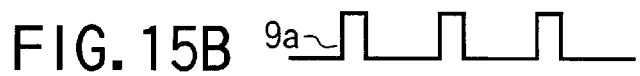
Figure 15C:
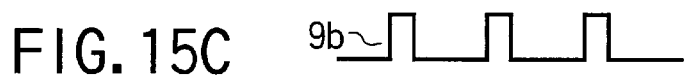

If the display using these LEDs is confused with other displays, two LEDs 9a and 9b may be blinked alternately or simultaneously as shown in FIGS. 15A to 15C.

Figure 16:
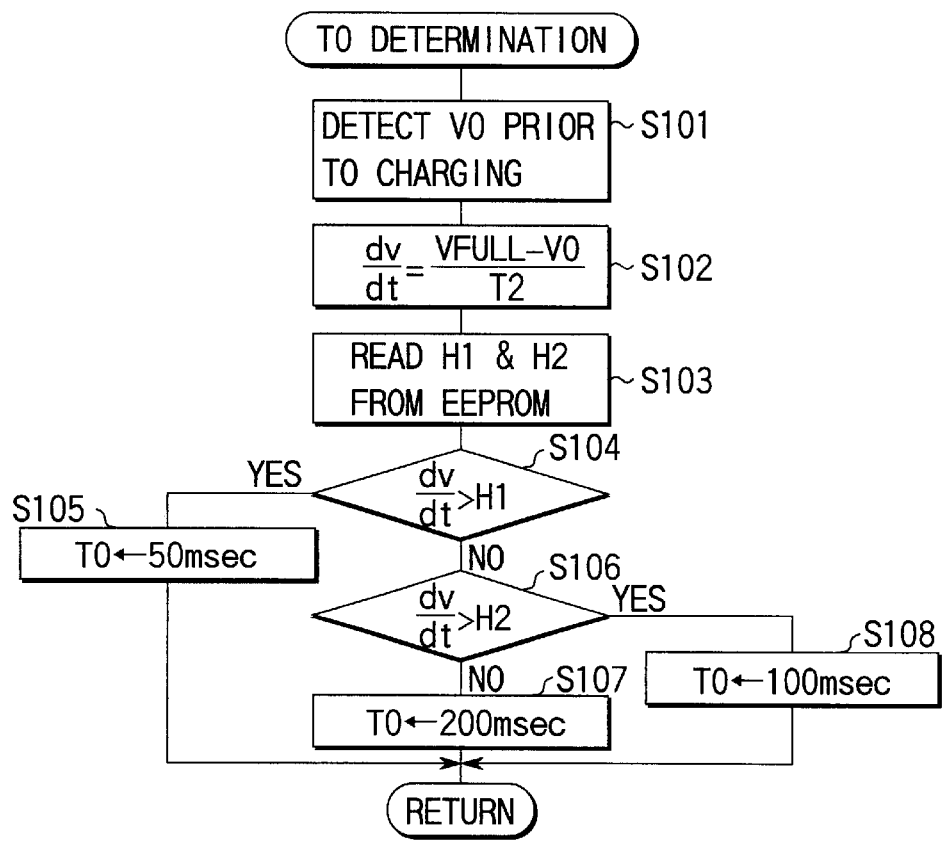
FIG. 16 is a flowchart illustrating the procedure of switching the battery check timing according to a change of voltage with time at the time of charging.

Finally, reference is made to a flowchart of FIG. 16 to describe an example of switching the battery check timing in accordance with the change of voltage with time rather than T2.

This example is devised in view of the fact that the charge start voltage is not necessarily constant in cameras capable of changing the amount of light emitted from the flash unit.

In the following description, the termination voltage is assumed to be fixed at a constant value Vfull.

First, the CPU 1 detects the voltage Vo prior to charging (step S101) and then detects its rate of change, i.e., a gradient (step S102).

In general, each of parts used in cameras of the same type varies from camera to camera and hence the charging time also varies from camera to camera even if the same battery is used. This may adversely affect the determination of the battery condition.

To prevent this, determination values H1 and H2 that reflect the characteristics of each camera are prestored in an electrically writable memory (EEPROM) during the manufacture of it.

At the time of battery check, the CPU 1 refers to the determination values H1 and H2 in step S103 to make accurate battery determinations regardless of parts variations from camera to camera.

In this manner, the CPU 1 compares the gradient of charging with the determination values H1 and H2 to determine the battery check timing (steps S104 through S108).

According to this example, the first check is made for battery condition at the timing of charging the flash unit, thus allowing for energy saving and providing for time lag.

According to the present invention, as described above, a camera battery check system can be provided which can achieve energy saving to allow the user to enjoy shooting many times with one-time battery replacement by performing control taking into consideration the sleeping phenomenon and recovery characteristics of batteries.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended claims and their equivalents.

What is claimed is:

1. A battery check system for use in a camera comprising:
   a monitor circuit for detecting a condition of a battery used in the camera; and
   a control circuit for controlling the operation of the monitor circuit and controlling the operation of the camera according to an output from the monitor circuit, wherein the control circuit causes the monitor circuit to detect changed conditions of the battery and determines a detection timing of the voltage of the battery based on a detection result of the monitor circuit.

2. The battery check system according to claim 1, wherein the control circuit causes the monitor circuit to detect the voltage of the battery according to a determined detection timing after determining the detection timing.

3. The-battery check system according to claim 1, wherein the control circuit drains a dummy load current from the battery according to a determined detection timing.

4. The battery check system according to claim 1, wherein the detection timing includes a delay time from a required time that the voltage of the battery is recovered to a detection time that the voltage of the battery is detected.

5. The battery check system according to claim 1, wherein the control circuit drains a dummy load current from the battery and causes the monitor circuit to detect the recovered state of the battery after the dummy load current was drained as a changed condition of the battery.

6. The battery check system according to claim 1, further comprising a temperature sensor for detecting the internal temperature of the camera, and wherein the control circuit determines the times of detecting the voltage of the battery taking into considerations the output of the temperature sensor.

7. The battery check system according to claim 1, further comprising a display section for displaying the residual energy of the battery, and the operation of the camera includes a control operation on the display section.

8. The battery check system according to claim 7, wherein the control circuit causes the display section to blink while the monitor circuit is detecting the voltage of the battery.

9. The battery check system according to claim 1, wherein the control circuit causes the monitor circuit to detect the voltage of the battery according to a determined detection timing in a repetitive manner.

10. The battery check system according to claim 1, wherein the detection timing includes a detection interval of the voltage of the battery by the monitor circuit.

11. The battery check system according to claim 1, wherein the control circuit causes the battery to pass a current through an electrical load and causes the monitor circuit to detect a difference between voltages of the battery before and after passing the current through the electrical load as a changed condition of the battery.

12. The battery check system according to claim 11, wherein the electrical load includes a light source used to automatically bring the camera into focus.

13. The battery check system according to claim 1, further comprising a charging circuit for charging an electronic flash unit.

14. The battery check system according to claim 13, wherein the monitor circuit has a first timer for counting a time interval from when the charging circuit starts charging until the charged voltage reaches a predetermined value and detects the condition of the battery on the basis of the output of the first timer.

15. The battery check system according to claim 13, wherein the monitor circuit has a second timer for counting a time that elapses from when the charging circuit terminates charging and detects the condition of the battery on the basis of the output of the second timer.

16. The battery check system according to claim 13, wherein the monitor circuit has a first timer for counting a time interval from when the charging circuit starts charging until the charged voltage reaches a predetermined value and a second timer for counting a time that elapses from when the charging circuit terminates charging and detects the condition of the battery on the basis of the outputs of the first and second timers.

17. The battery check system according to claim 13, wherein the monitor circuit detects changes in voltage while the charging circuit is charging the flash unit and detects the condition of the battery on the result of the detection of the changes in voltage.

18. A battery check method for detecting the voltage of a battery aboard equipment comprising the steps of:
   detecting a changed condition of the battery; and
   determining a detection timing of the voltage of the battery based on a detection result of the changed condition of the battery.

19. The method according to claim 18, further comprising the step of detecting the voltage of the battery according to the determined detection timing.

20. The method according to claim 18, further comprising the step of draining a dummy load current from the battery according to a determined detection timing.

21. The method according to claim 18, further comprising the step of draining a dummy load current from the battery, the changed condition of the battery being the recovered state of the battery after the dummy load current was drained.

22. The method according to claim 18, further comprising the step of passing a current from the battery to an electrical load, the changed condition of the battery being a difference between voltages of the battery before and after passing the current through the electrical load.

23. The method according to claim 18, further comprising the step of passing a current from the battery to an electrical load, the changed condition of the battery being the recovered state of the battery after the current was passed through the electrical load.

24. A battery check system for use in a camera comprising:
   monitor means for detecting a condition of a battery used in the camera; and
   control means for controlling the operation of the monitor means and controlling the operation of the camera according to an output from the monitor means,
   wherein the control means causes the monitor means to detect changed conditions of the battery and determines a detection timing of the voltage of the battery based on a detection result of the monitor means.

25. The battery check system according to claim 24, wherein the control means drains a dummy load current from the battery and causes the monitor means to detect the recovered state of the battery after the dummy load current was drained as a changed condition of the battery.

26. The battery check system according to claim 24, further comprising a temperature sensor means for detecting the internal temperature of the camera, and wherein the control means determines the times of detecting the voltage of the battery taking into considerations the output of the temperature sensor means.

27. The battery check system according to claim 24, wherein the control means causes the monitor means to detect the voltage of the battery according to a determined detection timing after determining the detection timing.

28. The battery check system according to claim 24, further comprising display means for displaying the residual energy of the battery, and wherein the operation of the camera includes a control operation on the display means.

29. The battery check system according to claim 24, wherein the operation of the camera is a control operation of enabling the camera to take a shot.

30. The battery check system according to claim 24, wherein the control means drains a dummy load current from the battery and causes the monitor means to detect the recovered state of the battery after the dummy load current was drained as a changed condition of the battery.

31. The battery check system according to claim 24, wherein the control means causes the monitor means to detect the voltage of the battery according to a determined detection timing in a repetitive manner.

32. The battery check system according to claim 24, wherein the control means drains a dummy load current from the battery according to a determined detection timing in a repetitive manner.

33. A battery check system for use in a camera comprising:
   monitor means for detecting a condition of a battery used in the camera; and
   control means for switching the monitor means between a first mode in which a changed condition of the battery is detected and a second mode in which at least one of an operation of detecting and displaying the voltage of the battery at a predetermined time and an operation of enabling the camera to take a shot is performed, and
   wherein the control means switches the time at which the voltage of the battery is detected in the second mode according to the result of detection of the condition of the battery in the first mode.

34. The battery check system according to claim 33, further comprising load control means for draining a current from the battery, the load control means doubling as a charging circuit for a flash unit for use with the camera.

35. The battery check system according to claim 33, further comprising temperature sensor means for detecting the temperature of an environment in which the camera is used, and wherein the control means switches between the operation of displaying the voltage of the battery and the operation of enabling the camera to take a shot according to the temperature of the environment detected by the temperature sensor means.

36. A battery check system for use in a camera comprising:
   monitor means for detecting a condition of a battery used in the camera;
   charging means for charging an electronic flash unit for emitting an electronic flash of light;
   first detecting means for detecting at least one of a time after the termination of charging the electronic flash unit and a charging time;
   second detecting means for detecting the voltage of the battery and switching the operation of the camera based on a detected battery voltage; and control means for switching the time at which the battery voltage is detected by the second detecting means according to a detection result detected by the first detecting means.

37. A camera having a plurality of modes for determining a condition of a battery for operating the camera comprising:

mode switching means for switching the modes; and control means responsive to the mode switching means for switching forms of display visible to users.

38. The camera according to claim 37, wherein, when a mode that takes long to determine is selected, the corresponding display is blinked.

* * * * *